(12) United States Patent
Ji et al.

(10) Patent No.: US 9,927,007 B2
(45) Date of Patent: Mar. 27, 2018

(54) MULTI-STAGES AUTOMATIC TRANSMISSION FOR VEHICLE

(71) Applicant: Hyundai Motor Company, Seoul (KR)

(72) Inventors: Seong-Wook Ji, Ansan-si (KR); Jae-Chang Kook, Hwaseong-si (KR); Won-Min Cho, Hwaseong-si (KR); Myeong-Hoon Noh, Seongnam-si (KR); Kang-Soo Seo, Yongin-si (KR); Seong-Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 397 days.

(21) Appl. No.: 14/723,222

(22) Filed: May 27, 2015

(65) Prior Publication Data

US 2016/0123433 A1  May 5, 2016

(30) Foreign Application Priority Data

Nov. 4, 2014 (KR) .................. 10-2014-0151960

(51) Int. Cl.
 *F16H 3/66* (2006.01)
(52) U.S. Cl.
 CPC ....... *F16H 3/66* (2013.01); *F16H 2200/0069* (2013.01); *F16H 2200/2012* (2013.01); *F16H 2200/2046* (2013.01)
(58) Field of Classification Search
 CPC combination set(s) only.
 See application file for complete search history.

(56) References Cited

U.S. PATENT DOCUMENTS

| 7,614,975 B2 | 11/2009 | Seo |
| 7,651,431 B2 | 1/2010 | Phillips et al. |
| 8,460,151 B2 * | 6/2013 | Wittkopp .................. F16H 3/66 475/276 |
| 8,591,376 B1 | 11/2013 | Shim |
| 8,591,377 B1 | 11/2013 | Hoffman et al. |
| 8,663,055 B2 | 3/2014 | Brehmer et al. |
| 8,715,131 B2 | 5/2014 | Mellet et al. |

(Continued)

FOREIGN PATENT DOCUMENTS

| DE | 102009019046 A1 | 11/2010 |
| JP | 2012-112292 B2 | 6/2012 |

(Continued)

OTHER PUBLICATIONS

Search Report dated Mar. 2, 2016 for European Patent Application No. 15168095.6.

(Continued)

*Primary Examiner* — Ramya P Burgess
*Assistant Examiner* — Timothy Hannon
(74) *Attorney, Agent, or Firm* — Morgan Lewis & Bockius LLP

(57) ABSTRACT

A multi-stages automatic transmission for a vehicle may include first, second, third and fourth planetary gear sets each including first, second and third rotation elements, and friction members including first, second, third and fourth clutches and first and second brakes, in which an input shaft may be connected to the second rotation element of the first planetary gear set and the second rotation element of the fourth planetary gear set, and an output shaft may be connected to the second rotation element of the first planetary gear set.

8 Claims, 2 Drawing Sheets

(56) References Cited

U.S. PATENT DOCUMENTS

| | | | |
|---|---|---|---|
| 8,821,336 | B2 | 9/2014 | Wilton et al. |
| 9,453,559 | B2* | 9/2016 | Ji .............................. F16H 3/66 |
| 2005/0003924 | A1 | 1/2005 | Tabata et al. |
| 2008/0070740 | A1 | 3/2008 | Gumpoltsberger |
| 2008/0125269 | A1 | 5/2008 | Gumpoltsberger |
| 2008/0242492 | A1 | 10/2008 | Phillips |
| 2009/0017979 | A1* | 1/2009 | Phillips .................... F16H 3/66 475/282 |
| 2009/0264244 | A1 | 10/2009 | Hart |
| 2010/0210405 | A1* | 8/2010 | Phillips .................... F16H 3/66 475/284 |
| 2011/0045940 | A1 | 2/2011 | Gumpoltsberger |
| 2011/0045942 | A1 | 2/2011 | Gumpoltsberger |
| 2011/0177910 | A1* | 7/2011 | Wittkopp .................. F16H 3/66 475/275 |
| 2011/0245013 | A1 | 10/2011 | Kim |
| 2012/0172173 | A1 | 7/2012 | Wittkopp et al. |
| 2013/0316870 | A1 | 11/2013 | Goleski |
| 2014/0100073 | A1 | 4/2014 | Lee |
| 2014/0106923 | A1 | 4/2014 | Borgerson et al. |
| 2015/0099603 | A1 | 4/2015 | Goleski |
| 2016/0108995 | A1 | 4/2016 | Ji |
| 2016/0169335 | A1* | 6/2016 | Ji .............................. F16H 3/66 475/275 |

FOREIGN PATENT DOCUMENTS

| | | |
|---|---|---|
| JP | 2013-072464 A | 4/2013 |
| JP | 2013-190048 A | 9/2013 |
| JP | 2013-199957 A | 10/2013 |
| JP | 2013-199959 A | 10/2013 |
| JP | 2013-204706 A | 10/2013 |
| JP | 2013-204709 A | 10/2013 |
| JP | 2013-204717 A | 10/2013 |
| JP | 2014-035056 A | 2/2014 |
| JP | 2014-035057 A | 2/2014 |
| JP | 5530340 B2 | 4/2014 |
| JP | 2014-105848 A | 6/2014 |
| JP | 2014-105849 A | 6/2014 |
| JP | 2014-105850 A | 6/2014 |
| KR | 10-2012-0119451 A | 10/2012 |
| KR | 10-2013-0000171 A | 1/2013 |
| KR | 2013-0031457 A | 3/2013 |
| KR | 2013-0077146 A | 7/2013 |
| KR | 2014-0046240 A | 4/2014 |
| KR | 10-1394033 B1 | 5/2014 |
| KR | 10-1416108 B1 | 7/2014 |
| KR | 2014-0101859 A | 8/2014 |
| WO | WO 2013/100620 A1 | 7/2013 |

OTHER PUBLICATIONS

Christoph Dorr et al., The nine-speed automatic transmission 9G-Tronic of Mercedes-Benz, *ATZ-Automobiltechnische Zeitxchrift*, Jan. 31, 2014, Jan. 2014, pp. 40-45, Germany.
U.S. Appl. No. 14/720,244, filed May 22, 2015, now U.S. Pat. No. 9,453,559.
U.S. Appl. No. 14/723,092, filed May 27, 2015.
U.S. Appl. No. 14/723,173, filed May 27, 2015.

* cited by examiner

FIG.2

| GEAR | C1 | C2 | C3 | C4 | B1 | B2 | GEAR RATIO |
|---|---|---|---|---|---|---|---|
| 1 | ● | ● | | | | ● | 4.898 |
| 2 | | ● | | | ● | ● | 3.045 |
| 3 | ● | | | | ● | ● | 2.267 |
| 4 | ● | | | ● | | ● | 1.832 |
| 5 | ● | | | ● | ● | | 1.460 |
| 6 | | ● | | ● | ● | | 1.198 |
| 7 | ● | | ● | ● | | | 1.000 |
| 8 | | | ● | ● | ● | | 0.783 |
| 9 | | ● | ● | | ● | | 0.622 |
| 10 | ● | | ● | | ● | | 0.581 |
| R1 | ● | | ● | | | ● | 5.401 |

MULTI-STAGES AUTOMATIC TRANSMISSION FOR VEHICLE

CROSS-REFERENCE TO RELATED APPLICATION

The present application claims priority to Korean Patent Application No. 10-2014-0151960, filed Nov. 4, 2014, the entire contents of which is incorporated herein for all purposes by this reference.

BACKGROUND OF THE INVENTION

Field of the Invention

Various aspects of the present invention relate to an automatic transmission for a vehicle, and particularly, to a multi-stages automatic transmission for the vehicle equipped with a gear train implementing 10 forward speeds and 1 reverse speed with gear efficiency of 98.6%.

Description of Related Art

Recently, the technology development need for performance improvement has emerged similarly in the power train field by requirement of a higher need for fuel efficiency improvements due to strengthening of environmental regulations or rising oil prices.

Appropriate power train technologies corresponding to the need have been provided, including an engine downsizing technology and a multi-staging technology of an automatic transmission. The engine downsizing has merits of reducing weight and improving fuel efficiency, and particularly, the automatic transmission multi-staging has merits of securing drivability and competitiveness of fuel efficiency at the same time through design of an excellent gear ratio in terms of power performance and fuel efficiency by using more shift stages as compared to a 4-speed (or 5-speed), and 1 reverse speed automatic transmission.

An instance of such multi-staging of the automatic transmission, includes an 8 forward speed and 1 reverse speed automatic transmission by combining three planetary gear sets and six friction elements, and 9 forward speed and 1 reverse speed automatic transmission by combining four planetary gear sets, four friction elements and two dog clutches.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

In the related art, a problem arises in that in an automatic transmission, when the number of shift stages is increased, the number of internal components that make up the automatic transmission is increased when implementing the shift stages with a gear train through a planetary gear set.

Thus, in the multi-staging of the automatic transmission, above all it is important to achieve drivability and fuel efficiency competitiveness with the gear train structure without increasing the number of internal components, thus worsening vehicle mount ability, decreasing power transmission efficiency, and increasing weight and manufacturing cost.

Therefore, an optimal structure of the gear train which may lead to maximum efficiency with fewer components should be applied to the development of the 10 forward speed and 1 reverse speed automatic transmission to enhance the fuel efficiency effect with the increased shift stages compared to eight forward stages and one reverse stage of the automatic transmission or nine forward speed and 1 reverse speed automatic transmission.

Thus, the present invention considering such the points described above provides a multi-stages automatic transmission for a vehicle that improves drivability of the vehicle using an operation point of a low RPM range of an engine by implementing 10 forward speeds and 1 reverse speed with the gear train using four planetary gear sets, four clutches and two brakes, and especially, achieves better fuel efficiency improvement by the gear train implementing gear efficiency of 98.6%.

According to various aspects of the present invention, a multi-stages automatic transmission for a vehicle, may include first, second, third and fourth planetary gear sets each including first, second and third rotation elements and friction members including first, second, third and fourth clutches and first and second brakes, in which an input shaft may be connected to the second rotation element of the first planetary gear set and the second rotation element of the fourth planetary gear set, an output shaft may be connected to the second rotation element of the first planetary gear set, the third rotation element of the first planetary gear set may be connected to the second rotation element of the second planetary gear set, the third rotation element of the second planetary gear set may be connected to the first rotation element of the third planetary gear set, and the first rotation element of the third planetary gear set may be connected to the first rotation element of the fourth planetary gear set.

The first break may fix the first rotation element of the first planetary gear set, the second break may fix the third rotation element of the third planetary gear set, the first clutch may be connected to the input shaft and the first rotation element of the second planetary gear set, the second clutch may be connected to the first rotation element of the second planetary gear set and the first rotation element of the third planetary gear set, the third clutch may be connected to the third rotation element of the first planetary gear set and the third rotation element of the third planetary gear set, and the fourth clutch may be connected to the second rotation element of the third planetary gear set and the third rotation element of the fourth planetary gear set.

The first planetary gear set and the second planetary gear set may include a first compound planetary gear set, the third planetary gear set and the fourth planetary gear set may include a second compound planetary gear set, and a continuous combination path of the first compound planetary gear set and the second compound planetary gear set may be formed by the third rotation element of the second planetary gear set and the first rotation element of the third planetary gear set.

The first planetary gear set may include a first sun gear as the first rotation element, a first carrier as the second rotation element, and a first ring gear as the third rotation element, the second planetary gear set may include a second sun gear as the first rotation element, a second carrier as the second rotation element, and a second ring gear as the third rotation element, the third planetary gear set may include a third sun gear as the first rotation element, a third carrier as the second rotation element, and a third ring gear as the third rotation element, and the fourth planetary gear set may include a fourth sun gear as the first rotation element, a fourth carrier as the second rotation element, and a fourth ring gear as the third rotation element.

The first sun gear among the first sun gear, the first carrier and the first ring gear of the first planetary gear set may be connected to the first brake, the first carrier may be continuously fixedly connected to the input shaft and selectively connected to the second sun gear through the first clutch, and the first ring gear may be fixedly connected to the second carrier and selectively connected to the third ring gear through the third clutch.

The second sun gear among the second sun gear, the second carrier and the second ring gear of the second planetary gear set may be selectively connected to the input shaft through the first clutch and selectively connected to the third sun gear through the second clutch, the second carrier may be fixedly connected to the first ring gear, and the second ring gear may be fixedly connected to the third sun gear.

The third sun gear among the third sun gear, the third carrier, and the third ring gear of the third planetary gear set may be fixedly connected to the fourth sun gear and selectively connected to the second sun gear through the second clutch and fixedly connected to the second ring gear, the third carrier may be continuously fixedly connected to the output shaft, and the third ring gear may be connected to the second brake and selectively connected to the first ring gear through the third clutch.

The fourth sun gear among the fourth sun gear, the fourth carrier, and the fourth ring gear of the fourth planetary gear set may be fixedly connected to the third sun gear, the fourth carrier may be continuously fixedly connected to the input shaft, and the fourth ring gear may be selectively connected to the output shaft through the fourth clutch.

Such the multi-stages automatic transmission of the present invention implements 10 forward speeds and 1 reverse speed with the gear train using the four planetary gear sets, the four clutches, and the two brakes, thereby realizing an effect that components for 10 forward speeds and 1 reverse speed are minimized.

Also, the multi-stages automatic transmission has an effect that simultaneously achieves the fuel efficiency improvement according to 10 forward speeds by the structure of the optimized gear train with gear efficiency of 98.6% and improves drivability of the vehicle using an operation point of a low RPM range of the engine. In addition, the present invention has an effect of responding quickly to a market of the multi-stages automatic transmissions having an increased mounting ratio of more than 7-speed automatic transmission.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational view at each shift stage of friction members applied to a gear train of the exemplary multi-stages automatic transmission according to the present invention.

Figure 1:
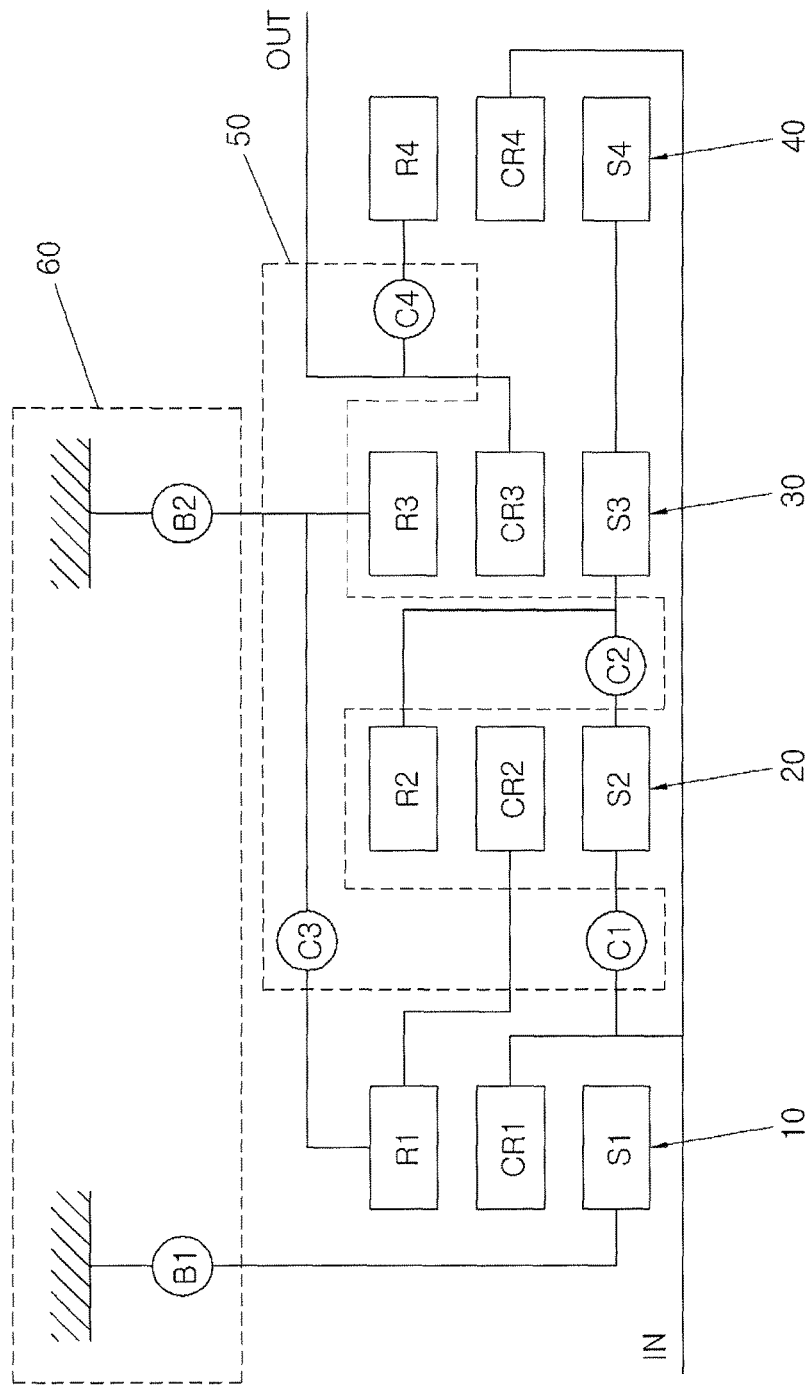
FIG. 1 is a gear train configuration of an exemplary multi-stages automatic transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a configuration of a gear train of a multi-stages automatic transmission for a vehicle according to the present invention. As shown, the gear train may include an input shaft IN as an input member associated with a turbine shaft of a torque converter, an output shaft OUT as an output member associated with a differential device, planetary gear sets 10, 20, 30 and 40 form a compound planetary gear device arrayed in the same axial line, and friction members are six members.

Therefore, the input coming into the input shaft IN may be made by the turbine shaft of the torque converter in which rotational power of an engine crank shaft is torque-converted through the torque converter and then input, and the output going from the output shaft OUT is connected to a known differential device which drives driving wheels. The compound planetary gear set may include a first compound planetary gear device and a second compound planetary gear device which are connected by at least one continuous combination path and by at least two selective combination paths.

As an example, the first compound planetary gear device may form a pair with the first and second planetary gear sets 10 and 20, and the second compound planetary gear device may form a pair with the third and fourth planetary gear sets 30 and 40. Further, the four compound planetary gear sets 10, 20, 30 and 40 may include each first, second and third rotation elements, and the friction members may be a clutch set 50 including a first, second, third and fourth clutches C1, C2, C3 and C4 and a brake set 60 including a first and second brakes B1 and B2 so that 10 forward speeds and 1 reverse speed may be embodied by selective operation connecting the three among six C1, C2, C3, C4, B1, B2.

Specifically, an arrangement of 10 forward speeds and 1 reverse speed may be configured as follows.

The first rotation element of the first planetary gear set 10 may be connected to the first brake B1, the second rotation element of the first planetary gear set 10 may be continuously fixedly connected to the input shaft IN which may be selectively connected to the first rotation element of the second planetary gear set 20 through the first clutch and the third rotation element of the first planetary gear set 10 may be fixedly connected to the second rotation element of the second planetary gear set 20 and may be selectively connected to the third rotation element of the third planetary gear set 30 through the third clutch C3.

The first rotation element of the second planetary gear set 20 may be selectively connected to the input shaft IN through the first clutch C1 and may be selectively connected to the first rotation element of the third planetary gear set 30 through the second clutch C2, the second rotation element of the second planetary gear set 20 may be fixedly connected to the third rotation element of the first planetary gear set 10, and the third rotation element of the second planetary gear set 20 may be fixedly connected to the first rotation element of the third planetary gear set 30.

The first rotation element of the third planetary gear set 30 may be fixedly connected to the first rotation element of the fourth planetary gear set 40 and may be selectively connected to the first rotation element of the second planetary gear set 20 through the second clutch C2 and may be fixedly connected to the third rotation element of the second planetary gear set 20, the second rotation element of the third planetary gear set 30 may be continuously fixedly connected to the output shaft OUT, and the third rotation element of the third planetary gear set 30 may be connected to the second brake 2 and may be selectively connected to the third rotation element of the first planetary gear set 10 through the third clutch C3.

The first rotation element of the fourth planetary gear set 40 may be fixedly connected to the first rotation element of the third planetary gear set 30, the second rotation element of the fourth planetary gear set 40 may be continuously fixedly connected to the input shaft IN, and the third rotation element of the fourth planetary gear set 40 may be selectively connected to the second rotation element of the third planetary gear set 30 through the fourth clutch C4.

In accordance with various embodiments of the present invention, the first planetary gear set 10 may include a first sun gear S1 as the first rotation element, a first carrier CR1 as the second rotation element and a first ring gear R1 as the third rotation element. The second planetary gear set 20 may include a second sun gear S2 as the first rotation element, a second carrier CR2 as the second rotation element and a second ring gear R2 as the third rotation element. The third planetary gear set 30 may include a third sun gear S3 as the first rotation element, a third carrier CR3 as the second rotation element and a third ring gear R3 as the third rotation element. The fourth planetary gear set 40 may include a fourth sun gear S4 as the first rotation element, a fourth carrier CR4 as the second rotation element and a fourth ring gear R4 as the third rotation element.

Therefore, the first sun gear S1 may be connected to the first brake B1, the first carrier CR1 may be continuously fixedly connected to the input shaft IN which may be selectively connected to the second sun gear S2 through the first clutch C1, and the first ring gear R1 may be fixedly connected to the second carrier CR2 and may be selectively connected to the third ring gear R3 through the third clutch C3. Further, the second sun gear S2 may be selectively connected to the input shaft IN through the first clutch C1 and may be selectively connected to the third sun gear S3 through the second clutch C2, the second carrier CR2 may be fixedly connected to the first ring rear R1, and the second ring gear R2 may be fixedly connected to the third sun gear S3.

Besides, the third sun gear S3 may be fixedly connected to the fourth sun gear S4 and may be selectively connected to the second sun gear S2 through the second clutch C2 and may be fixedly connected to the second ring gear R2, the third carrier CR3 may be continuously fixedly connected to the output shaft OUT, and the third ring gear R3 may be connected to the second brake B2 and may be selectively connected to the first ring gear R1 through the third clutch C3. Further, the fourth sun gear S4 may be fixedly connected to the third sun gear S3, the fourth carrier CR4 may be continuously fixedly connected to the input shaft IN, and the fourth ring gear R4 may be selectively connected to output shaft OUT through the fourth clutch C4.

Due to this structure, a continuous combination path of the first compound planetary gear device composed of the first and second planetary gear sets 10 and 20 and the second compound planetary gear device composed of the third and fourth planetary gear sets 30 and 40 may be formed with the second ring gear R2 and the third sun gear S3. Therefore, the first carrier CR1, the second sun gear S2 and the fourth carrier CR4 may act as the input element of the gear train, and the third carrier CR3 and the fourth ring gear R4 may act as the output element.

Further, the first brake B1 may be connected to the first sun gear S1, the second brake B2 may be connected to the third ring gear R3, the first clutch C1 may connect the input shaft IN with the second sun gear S2, the second clutch C2 may connect the second sun gear S2 with the third sun gear S3, the third clutch C3 may connect the first ring gear R1 with the third ring gear R3 and the fourth clutch C4 may connect the third carrier CR3 with the fourth ring gear R4. The first, second, third and fourth clutches C1, C2, C3 and C4 and the first and second breaks B1 and B2 may be composed to a multi-plates type hydraulic friction coupling unit friction-fitted by hydraulic pressure such as the conventional manner.

On the other hand, FIG. 2 is operational elements at each shift stage of the friction members applied to a gear train in accordance with various embodiments of the present invention. As shown, the first, second, third and fourth clutches C1, C2, C3 and C4 and the first and second breaks B1 and B2 may implement each shift stage by combining a total of three operating elements, thereby reducing the number of the inoperative friction elements, so that the friction drag loss may be reduced. This improves the power transmitting efficiency of the transmission and ultimately contributes to improving fuel efficiency of the vehicle.

At the 1st forward speed, the first clutch C1, the second clutch C2 and the second brake B2 are operated. Then, the operating of the first clutch C1 connects the input shaft IN fixed on the first carrier CR1 with the second sun gear S2, the operating of the second clutch C2 connects the second sun gear S2 with the third sun gear S3 and the operating of the second brake B2 allows the third ring gear R3 to fix. Due to this, the input of the input shaft IN is transmitted to the first carrier CR1, the fourth carrier CR4, the second sun gear S2 and the third sun gear S3, the output of the 1st forward speed is made at the third carrier CR3 of the third planetary gear set 30, the 1-speed output of the third carrier CR3 is transmitted to the differential device through the output shaft OUT, thereby the shifting of the 1st forward speed is completed.

At the 2nd forward speed, the second clutch C2, the first and second brakes B1 and B2 are operated by releasing of the first clutch C1 and operating of the first brake B1 in the state of the 1st forward speed. Then, the operating of the first brake B1 fixes the first sun gear S1, the releasing of the first clutch C1 disconnects the second sun gear S2 with the input shaft IN, and the second clutch C2 and the second brake B2 remain in operational state. Due to this, the output of the 2nd forward speed is made at the third carrier CR3 of the third planetary gear set 30, the 2-speed output of the third carrier CR3 is transmitted to the differential device through the output shaft OUT, thereby the shifting of the 2nd forward speed is completed.

At the 3rd forward speed, the first clutch C1 and the first and second brakes B1 and B2 are operated by releasing of the second clutch C2 and operating of the first clutch C1 in the state of the forward 2-speed. Then, the releasing of the second clutch C2 disconnects the second sun gear S2 with the third sun gear S3, the operating of the first clutch C1 connects the input shaft IN fixed on the first carrier CR1 with the second sun gear S2, and the first and second brakes B1 and B2 remain in operational state. Due to this, the output of the 3rd forward speed is made at the third carrier CR3 of the third planetary gear set 30, the 3-speed output of the third carrier CR3 is transmitted to the differential device through the output shaft OUT, thereby the shifting of the 3rd forward speed is completed.

At the 4th forward speed, the first and fourth clutches C1 and C4 and the second brake B2 are operated by releasing of the first brake B1 and operating of the fourth clutch C4 in the state of the 3rd forward speed. Then, the releasing of the first brake B1 releases the first sun gear S1, the operating of the fourth clutch C4 connects the fourth ring gear R4 with the output shaft OUT, and the first clutch C1 and the second brake B2 remain in operational state. Due to this, the output of the 4th forward speed is made at the third carrier CR3 of the third planetary gear set 30, the 4-speed output of the third carrier CR3 is transmitted to the differential device through the output shaft OUT, thereby the shifting of the 4th forward speed is completed.

At the 5th forward speed, the first and fourth clutches C1 and C4 and the first brake B1 are operated by releasing of the second brake B2 and operating of the first brake B1 in the state of the 4th forward speed. Then, the releasing of the second brake B2 releases the third ring gear R3, the operating of the first brake B1 fixes the first sun gear S1, and the first and fourth clutches C1 and C4 remain in operational state. Due to this, the output of the 5th forward speed is made at the third carrier CR3 of the third planetary gear set 30, the 5-speed output of the third carrier CR3 is transmitted to the differential device through the output shaft OUT, thereby the shifting of the 5th forward speed is completed.

At the 6th forward speed, the second and fourth clutches C2 and C4 and the first brake B1 are operated by releasing of the first clutch C1 and operating of the second clutch C2 in the state of the 5th forward speed. Then, the releasing of the first clutch C1 disconnects the second sun gear S2 with the input shaft IN, the operating of the second clutch C2 connects the second sun gear S2 with the third sun gear S3, and the fourth clutch C4 and the first brake B1 remain in operational state. Due to this, the output of the 6th forward speed is made at the third carrier CR3 of the third planetary gear set 30, the 6-speed output of the third carrier CR3 is transmitted to the differential device through the output shaft OUT, thereby the shifting of the 6th forward speed is completed.

At the 7th forward speed, the first, third and fourth clutches C1, C3 and C4 are operated by releasing of the second clutch C2 and the first brake B1 and operating of the first clutch C1 and the third clutch C3 in the state of the 6th forward speed. Then, the releasing of the second clutch C2 disconnects the second sun gear S2 with the third sun gear S3, the releasing of the first brake B1 releases the first sun gear S1, the operating of the first clutch C1 connects the input shaft IN fixed on the first carrier CR1 with the second sun gear S2, the operating of the third clutch C3 connects the first ring gear R1 with the third ring gear R3, and the fourth clutch C4 remains in operational state. Due to this, the output of the 7th forward speed is made at the third carrier CR3 of the third planetary gear set 30, the 7-speed output of the third carrier CR3 is transmitted to the differential device through the output shaft OUT, thereby the shifting of the 7th forward speed is completed.

At the 8th forward speed, the third and fourth clutches C3 and C4 and the first brake B1 are operated by releasing of the first clutch C1 and operating of the first brake B1 in the state of the 7th forward speed. Then, the releasing of the first clutch C1 disconnects the second sun gear S2 with the input shaft IN, the operating of the first brake B1 fixes the first sun gear S1, and the third and fourth clutches C3 and C4 remain in operational state. Due to this, the output of the 8th forward speed is made at the third carrier CR3 of the third planetary gear set 30, the 8-speed output of the third carrier CR3 is transmitted to the differential device through the output shaft OUT, thereby the shifting of the 8th forward speed is completed.

At the 9th forward speed, the second and third clutches C2 and C3 and the first brake B1 are operated by releasing of the fourth clutch C4 and operating of the second clutch C2 in the state of the 8th forward speed. Then, the releasing of the fourth clutch C4 disconnects the fourth ring gear R4 with the output shaft OUT, the operating of the second clutch C2 connects the second sun gear S2 with the third sun gear S3, and the third clutch C3 and the first brake B1 remain in operational state. Due to this, the output of the 9th forward speed is made at the third carrier CR3 of the third planetary gear set 30, the 9-speed output of the third carrier CR3 is transmitted to the differential device through the output shaft OUT, thereby the shifting of the 9th forward speed is completed.

At the 10th forward speed, the first and third clutches C1 and C3 and the first brake B1 are operated by releasing of the second clutch C2 and operating of the first clutch C1 in the state of the 9th forward speed. Then, the releasing of the second clutch C2 disconnects the second sun gear S2 with the third sun gear S3, the operating of the first clutch C1 connects the input shaft IN fixed on the first carrier CR1 with the second sun gear S2, and the third clutch CR3 and the first brake B1 remain in operational state. Due to this, the output of the 10th forward speed is made at the third carrier CR3 of the third planetary gear set 30, the 10-speed output of the third carrier CR3 is transmitted to the differential device through the output shaft OUT, thereby the shifting of the 10th forward speed is completed.

At the 1 reverse speed, the first and third clutches C1 and C3 and the second brake B2 are operated. Then, the operating of the first clutch C1 connects the input shaft IN fixed on the first carrier CR1 with the second sun gear S2, the operating of the third clutch C3 connects the first ring gear R1 with the third ring gear R3, and the operating of the second brake B2 allows the third ring gear R3 to fix. Due to this, the input of the input shaft IN is transmitted to the first carrier CR1, the fourth carrier CR4 and the second sun gear S2, and the output of the 1 reverse speed is made at the third carrier CR3 of the third planetary gear set 30, the 1 reverse speed output of the third carrier CR3 is transmitted to the differential device through the output shaft OUT, thereby the shifting of the 1 reverse speed is completed.

As described above, the multi-stages automatic transmission for the vehicle according to various embodiments of the present invention includes a gear train composed of four planetary gear sets 10, 20, 30 and 40, six friction members made of the first, second, third and fourth clutches C1, C2, C3 and C4 and the first and second brakes B1 and B2, implements 10 forward speeds and 1 reverse speed with a various array of the first, second, third and fourth clutches C1, C2, C3 and C4 on rotation elements, in particular, implements a sequential shift scheme of three friction members which takes one after loosen one of the friction members C1, C2, C3, C4, B1 and B2.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stages automatic transmission for a vehicle, comprising:
    first, second, third and fourth planetary gear sets each including first, second and third rotation elements; and
    friction members including first, second, third and fourth clutches and first and second brakes,
    wherein an input shaft is connected to the second rotation element of the first planetary gear set and the second rotation element of the fourth planetary gear set, an output shaft is connected to the second rotation element of the third planetary gear set, the third rotation element of the first planetary gear set is connected to the second rotation element of the second planetary gear set, the third rotation element of the second planetary gear set is connected to the first rotation element of the third planetary gear set, and the first rotation element of the third planetary gear set is connected to the first rotation element of the fourth planetary gear set,
    wherein the first planetary gear set comprises a first sun gear as the first rotation element of the first planetary gear set, a first carrier as the second rotation element of the first planetary gear set, and a first ring gear as the third rotation element of the first planetary gear set,
    wherein the second planetary gear set comprises a second sun gear as the first rotation element of the second planetary gear set, a second carrier as the second rotation element of the second planetary gear set, and a second ring gear as the third rotation element of the second planetary gear set,
    wherein the third planetary gear set comprises a third sun gear as the first rotation element of the third planetary gear set, a third carrier as the second rotation element of the third planetary gear set, and a third ring gear as the third rotation element of the third planetary gear set,
    wherein the fourth planetary gear set comprises a fourth sun gear as the first rotation element of the fourth planetary gear set, a fourth carrier as the second rotation element of the fourth planetary gear set, and a fourth ring gear as the third rotation element of the fourth planetary gear set, and
    wherein the first sun gear among the first sun gear, the first carrier and the first ring gear of the first planetary gear set is connected to the first brake, the first carrier is continuously fixedly connected to the input shaft and selectively connected to the second sun gear through the first clutch, and the first ring gear is fixedly connected to the second carrier and selectively connected to the third ring gear through the third clutch.

2. The multi-stages automatic transmission for the vehicle of claim 1, wherein the first brake fixes the first rotation element of the first planetary gear set, the second brake fixes the third rotation element of the third planetary gear set, the first clutch is connected to the input shaft and the first rotation element of the second planetary gear set, the second clutch is connected to the first rotation element of the second planetary gear set and the first rotation element of the third planetary gear set, the third clutch is connected to the third rotation element of the first planetary gear set and the third rotation element of the third planetary gear set, and the fourth clutch is connected to the second rotation element of the third planetary gear set and the third rotation element of the fourth planetary gear set.

3. The multi-stages automatic transmission for the vehicle of claim 2, wherein the second sun gear among the second sun gear, the second carrier and the second ring gear of the second planetary gear set is selectively connected to the input shaft through the first clutch and selectively connected to the third sun gear through the second clutch, the second carrier is fixedly connected to the first ring gear, and the second ring gear is fixedly connected to the third sun gear.

4. The multi-stages automatic transmission for the vehicle of claim 2, wherein the third sun gear among the third sun gear, the third carrier, and the third ring gear of the third planetary gear set is fixedly connected to the fourth sun gear and selectively connected to the second sun gear through the second clutch and fixedly connected to the second ring gear, the third carrier is continuously fixedly connected to the output shaft, and the third ring gear is connected to the second brake and selectively connected to the first ring gear through the third clutch.

5. The multi-stages automatic transmission for the vehicle of claim 2, wherein the fourth sun gear among the fourth sun gear, the fourth carrier, and the fourth ring gear of the fourth planetary gear set is fixedly connected to the third sun gear, the fourth carrier is continuously fixedly connected to the input shaft, and the fourth ring gear is selectively connected to the output shaft through the fourth clutch.

6. The multi-stages automatic transmission for the vehicle of claim 1, wherein the second sun gear among the second sun gear, the second carrier and the second ring gear of the second planetary gear set is selectively connected to the input shaft through the first clutch and selectively connected to the third sun gear through the second clutch, the second carrier is fixedly connected to the first ring gear, and the second ring gear is fixedly connected to the third sun gear.

7. The multi-stages automatic transmission for the vehicle of claim 1, wherein the third sun gear among the third sun gear, the third carrier, and the third ring gear of the third planetary gear set is fixedly connected to the fourth sun gear and selectively connected to the second sun gear through the second clutch and fixedly connected to the second ring gear, the third carrier is continuously fixedly connected to the output shaft, and the third ring gear is connected to the second brake and selectively connected to the first ring gear through the third clutch.

8. The multi-stages automatic transmission for the vehicle of claim 1, wherein the fourth sun gear among the fourth sun gear, the fourth carrier, and the fourth ring gear of the fourth planetary gear set is fixedly connected to the third sun gear, the fourth carrier is continuously fixedly connected to the input shaft, and the fourth ring gear is selectively connected to the output shaft through the fourth clutch.

* * * * *